Figure 1:
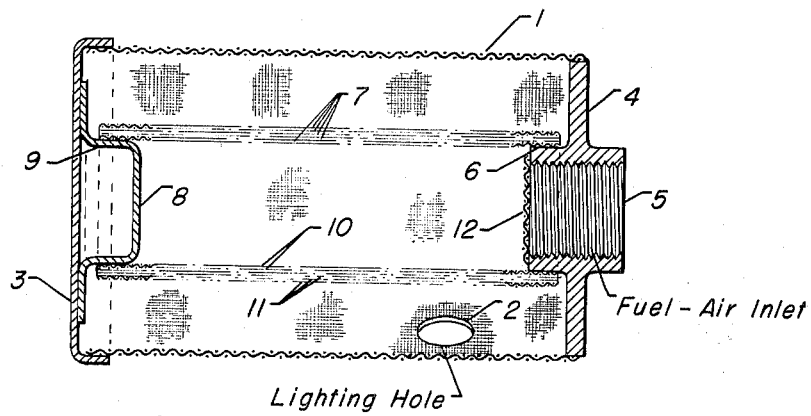

Sept. 7, 1965    R. J. RUFF ETAL    3,204,683
GAS-FUELED CATALYTIC INFRA-RED HEAT PRODUCING ELEMENT
Filed Nov. 30, 1962

INVENTORS:
Richard J. Ruff
Truman J. Hebert
BY: James R. Hoatson Jr.
Philip J. Liggett
ATTORNEYS

United States Patent Office 3,204,683
Patented Sept. 7, 1965

3,204,683
GAS-FUELED CATALYTIC INFRA-RED HEAT
PRODUCING ELEMENT
Richard J. Ruff, Detroit, Mich., and Truman J. Hebert, Bloomer, Wis., assignors to Universal Oil Products Company, Des Plaines, Ill., a corporation of Delaware
Filed Nov. 30, 1962, Ser. No. 241,241
1 Claim. (Cl. 158—114)

The present invention relates to an improved catalytic infra-red heat producing element and especially an improved form of cylindrical element which may be used as an individual unit in a reflector or as one of a plurality of units receiving fuel from a feed manifold arrangement.

Infra-red energy is electro-magnetic radiation, acting in a manner similar to light waves in that the energy travels at the speed of light and is reflected by shiny reflective surfaces according to the laws of optics. At the present time there are, of course, many types of infra-red heating units including electrical, direct fired ceramic block or porous refractory arrangements which provide heat radiating surfaces and, in addition, catalytic surface constructions which result in flameless fuel oxidation and infra-red energy emission.

The use of flame in ceramic cups, or with porous refractory radiating surfaces, is of benefit in various individual heaters and drying ovens, but is generally unsatisfactory for small installations, or in space heaters for home use. There is a problem of flue gas removal and the danger of handling breakable ceramic types of apparatus.

Electrical infra-red heaters are prevalent and are commonly used as space heaters, as long as an electrical supply is available; however, for camping or for boats and general outdoor or rural use where electricity is not available, then means for effecting bottled gas heating, such as provided for by the present design, is of particular advantage. Actually, in certain industrial operations there may be an advantage in heating from gas fed infra-red energy over electrical energy in that the former produces infra-red heat with a longer wave length, the energy of which is absorbed more readily by many materials or surfaces.

It is a principal object of the present invention to provide an improved cylindrical form of catalytic infra-red heater element for space heating use that is particularly adapted to utilize bottled gas fuel.

It is also an object of the present invention to utilize a high temperature resistant alloy metal gauze construction which has a noble metal surface as an oxidizing catalyst to provide a unit with a long life that can effectively produce infra-red energy with a high emissivity factor.

A further object of the improved design and construction is to make use of a multiple layer cylinder-form metal gauze construction which provides for easy fabrication and rapid assembly thereof, as well as provide for easy lighting and efficient catalytic oxidation of a fuel air mixture being supplied to the unit.

In one embodiment, the present invention provides a catalytic heat generating element comprising in combination, a cylindrical form high temperature resistant metal gauze outer wall member spaced concentrically around a coated multi-layer high temperature resistant metal gauze tubular core member, the latter having at least one exterior layer covered with a noble metal oxidizing catalyst, end closure plates connecting across both ends of said outer cylindrical gauze member and said core member, support means inside of each end closure plate connecting with each end of said tubular core member for holding the latter in a central position, and axial fuel-air inlet port means through at least one of said end closure plates, whereby the fuel-air mixture entering the inside of the core member through said inlet port means is distributed radially outwardly to be catalytically oxidized in a flameless infra-red heat generating manner on the outer surface of the core member.

In a preferred embodiment, the outer cylindrical gauze or screen is also provided with a small lighting hole. The lighting hole is of particular advantage in providing for the easy lighting of the element. It has been found that as fuel passes radially outwardly from the inner core of the element that the initial lighting of the gas-air mixture provides a small amount of low flame around the external cylindrical wall and subsequently such outer wall becomes slightly red by virtue of the fuel burning and heat generation. This initial flame and heating in turn radiates heat backwardly to the outer catalytic surface of the inner core member so that as the latter is increased in temperature there is initiated a flameless catalytic oxidation of the fuel-air mixture passing through the inner core whereby all of the fuel is burned at the inner location. As a result, all flame and redness over the outer surface of the element disappears. A desired form of the element also embodies the use of a metal catalyst surface to the outer screen. The catalyst coating provides a long-life outer member and a spaced outer surface to insure completion of the oxidation of the fuel gas passing through the unit.

In the multiple layer design and construction of the inner core, a preferred construction of the element utilizes at least one internal non-catalytic screen within the inner tubular catalytic core member as a heat absorbing or heat reflective element. Such inner layer or layers may be directly adjacent the one or more layers of catalytically activated metal gauzes or screens, or alternatively spaced slightly away from such activated layers.

Various types of temperature resistant metal screens or gauzes, as well as various types of catalytic coatings, may be used to provide a fuel oxidizing infra-red heat radiating surface; however, a preferable construction utilizes metal alloy screens of a relatively fine mesh to serve as a base material for the catalytic layer. Stainless steel mesh, such as Chromel, Nichrome, or other chrome-nickel alloys, particularly in the 30 to 70 mesh range may be used for the base for high temperature infra-red heat generating purposes. Such meshes will, of course, have small diameter wire of the order of 0.01 inch in diameter or less, although it is not intended to limit the construction of the present improved element to the use of any one predetermined size of screening wire and mesh or number of layers in the inner core or outer cylindrical wall.

The catalytic activation of the outer screen layers of the inner core, as well as of the outer wall, is preferably by a noble metal deposition comprising platinum, or palladium, or a platinum group metal, either alone or in combination with one or more of the other members of the group. Such metal surfaces are highly efficient oxidizing catalysts and have the ability to withstand high temperature use for a long period of time. Also, small percentages of other activating components such as thorium, ruthenium, tungsten, cesium and the like may be applied in combination with the platinum group metal. The deposition may be carried out by electroplating, or other electrodeposition operation, in a manner similar to that set forth in the H. R. Suter and R. J. Ruff U.S. Patent No. 2,720,494 issued October 11, 1955. This patent sets forth a means for preparing and activating alloy metal wire or screen to provide a desirable form of oxidizing or incinerating element, and it is believed unnecessary to herein set forth the detail for applying an activated coating to alloy mesh material for the present infra-red heat generating element, reference being made to the foregoing patent for the description thereof.

Reference to the accompanying drawing and the following description will serve to illustrate one preferred embodiment of the unit, as well as point out advantageous features in connection with the construction and assembly of an individual element and an arrangement for a plurality of elements.

FIGURE 1 of the drawing is a sectional view through one form of the cylindrical catalytic infra-red heat generating element.

Figure 2:
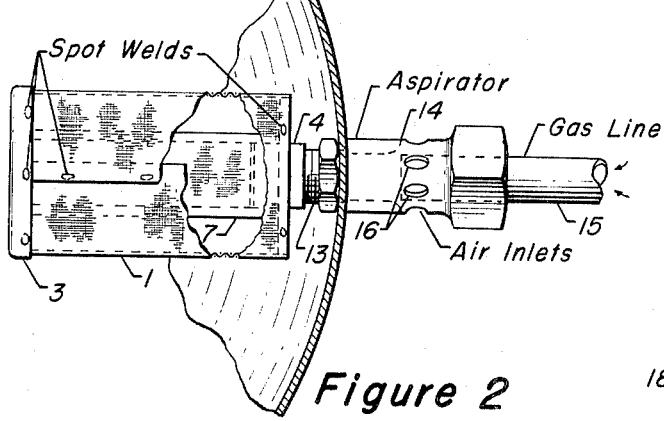

FIGURE 2 of the drawing shows diagrammatically the improved cylindrical form infra-red element in an assembly with an air aspirator means connecting to one end thereof.

Figure 3:
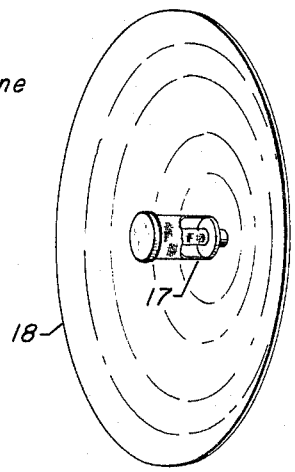
Figure 4:
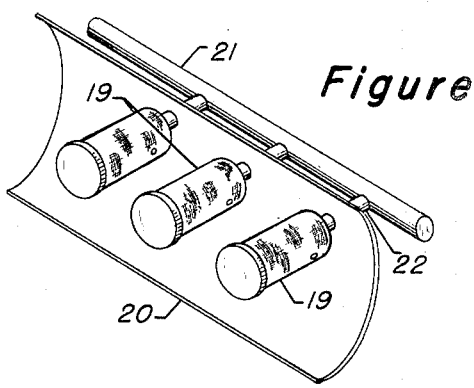

FIGURES 3 and 4 of the drawing illustrate, respectively, the use of a single element in a single reflector means and the use of a plurality of elements in a row-like arrangement within an elongated reflector.

Referring now particularly to FIGURES 1 and 2 of the drawing there is shown a unit having an external cylindrical metal screen or gauze member 1 with a lighting hole 2. This outer gauze member is of an alloy material with or without a catalytic coating; however, as hereinbefore set forth, where the outer gauze is provided with a noble metal surface capable of effecting catalytic combustion in the fuel-air mixture passing therethrough, there is insured a long life to the surface and in effect a second stage for catalytic combustion as well as an efficient initial lighting surface. The gauze 1 may be relatively fine, say in the 20 to 50 mesh range, although, in general, it is preferably of a larger mesh than the inner catalytically coated layers. Each end of the cylindrical outer screen connects with supporting end closure members, which in this embodiment, comprise a flanged end plate or cap member 3 and an end plate member 4. The latter is provided with a threaded central opening 5 which serves as a fuel-air inlet port to the inside of the unit. The inner face portion of the end member 4 is also provided with a round shoulder section 6 which serves to slip into and hold the interior multiple layer core member 7. At the opposing end of the element, in combination with the end cap member 3, there is provided a shoulder support member 8 which has a circular offset shoulder portion 9 that is of an equivalent diameter to the shoulder section 6 on end closure plate 4 such that it is adapted to slidably fit into and support the opposing end of the core member 7. The shoulder support member 8 may, if desired, be formed as a part of the end cap member 3 or, as indicated in the present drawing, and in accordance with a preferred construction and assembly arrangement, the two parts may be separate, with the flange of shoulder member 8 being formed to slidably rest against the inside surface of the cap member 3.

The multiple layer core member 7 of the present embodiment comprises two inner cylindrical layers 10 of metal alloy of a relatively fine mesh, say in the 30 to 50 mesh range, while the outer three layers 11 are coated with a noble metal oxidizing catalyst layer and are of a somewhat smaller mesh say in the 60 to 70 mesh range. The use of relatively fine mesh gauze material for the entire inner layers of the tubular core member insures that there is a sufficient pressure drop to provide uniform distribution of the fuel-air stream radially outwardly through the entire element. Also, the use of multiple layers of catalytically activated gauze 11 externally around the tubular core member insures that there is substantially complete oxidation of the fuel and air as the mixed gas stream passes through the surface to be converted into infra-red energy. It may be further pointed out that the use of one or more innermost uncoated layers 10 will serve to increase the efficiency of the overall operation by reflecting heat outwardly from the element while at the same time absorbing a certain quantity of heat by conduction and/or radiation which will serve to preheat the fuel-air mixture passing therethrough to the catalytically active screens.

A small round internal screen member 12 is attached across the interior face of shoulder 6 and of the threaded fuel-air inlet port 5 to serve as a preliminary fuel distributing screen and at the same time preclude the entrance of any large foreign particles to the interior of the unit.

As best shown in FIGURE 2 of the drawing, the present element is adapted to be threadedly attached to a pipe nipple or the threaded end 13 of air aspirator unit 14. Each element or unit (the terms being used interchangeably herein) may thus be readily placed in position or changed in the manner of an ordinary light bulb. It is not, however, intended to limit the use of the present element to any one type of air aspirator or to any one type of connector means. In other words, the unit may have the end closure plate 4 provided with external threading on a projecting stub end such that it is adapted to be screwed into an internally threaded coupling or connector means from a fuel-air inlet supply line. The illustrated aspirator 14 is provided with means to connect to a fuel inlet line 15 and has a plurality of peripheral air inlet ports 16 which communicate internally of the aspirator body to effect mixing with the fuel from line 15 to transmit a resulting fuel-air mixture through pipe section or nipple 13 to the fuel-air inlet port 5 of the end plate 4 whereby the mixture radiates radially outwardly through the tubular core member 7 for catalytic oxidation.

A preferred construction and assembly of the various portions of the element provides that the inner multiple layer core member 7 is formed by successively wrapping the inactive and catalytically active mesh layers 10 and 11 into a tubular form and spot welding it at spaced points to hold it in a desired tube form and size to slidably fit over the shoulder portions 6 and 9 at the end closure plates 4 and 3, respectively. The outer cylindrical screen 1 may also be wrapped to form it into a cylindrical size to fit externally over the end closure plate member 4 and to connect with the end cap member 3. Spaced tack welded spots may also be utilized in this instance to hold the cylindrical screen member 1 in shape and to attach its ends respectively to the end plate 4 and the end cap member 3. There is no actual need for effecting spot welding or other fixed attachment between the inner core member 7 and the shoulder sections 6 and 9 inasmuch as the subsequent welding or other attachment between the outer cylinder wall 1 and the end closure plates will maintain the inner tubular member in its proper axial position. The use of a separate shoulder support section 8 permits its insertion into the end of the core member 7 prior to the subsequent engagement and attachment between end cap member 3 and the outer cylindrical wall 1. However, preferably the shoulder support member 8 is provided with a wide circular flange section which will slidably rest on the inside of cap member 3 and will serve to center the inner tubular member of the inner core member within the end cap 3. Alternative, and generally less preferable, core connecting means may comprise small threaded bolt or screw means, or clamping means, between the ends of the core member and the end plates.

In a preferred construction and arrangement, the lighting hole 2 within the outer cylindrical screen 1 is provided at an end of the assembled element adjacent the fuel-air inlet port means so as to assist in the rapid lighting of the element. With an axial fuel-air inlet arrangement, there may be an initial high velocity flow of the fuel-air mixture into the inner core member 7 such that there will be a larger flow of the gas outwardly radially from the downstream end of the element after deflection against the inside surface of the shoulder 8, particularly while the unit is cold. Such initial high velocity flow of the gas stream may tend to blow out the igniting means. Thus, it is preferable to have the match or lighting torch applied adjacent to the upstream end of the unit through a hole, such as 2, whereby there is ready access to a low velocity fuel-air mixture. As explained briefly hereinbefore, at the time of effecting the lighting or ignition of the unit for infra-red heat generation there may be a small amount of flame produced around at least portions of the outer screen 1 until such time as infra-red heat generation from the outer screen or from the flame encompassing it radiates sufficient heat backwardly to the catalytic layers 11 whereby flameless catalytic oxidation spreads across the entire cylindrical surface of the core member 7. Generally, the flame and oxidation of fuel which takes place around and through the external cylindrical screen 1 continues for only approximately one minute, after which sufficient heat is provided to insure initiation and maintenance of the catalytic oxidation through the core member. The latter effects substantially complete oxidation of the fuel-air mixture around and for the full length of the external surface of outer layer 11 of the core member 7 whereby a high temperature red glow provides a high infra-red emissivity available as heat energy. In view of the cylindrical form of the element it is particularly adapted to be used in connection with various types of reflectors such that the infra-red energy may be directed in a controlled direction to a heat absorbing surface.

As best shown in FIGURE 3 of the drawing, there is shown the use of a single catalytic infra-red element 17 placed concentrically in a dished or parabolic form of reflector 18 to cause the infra-red rays to be in turn directed in a spot manner against a particular object or in a general direction.

FIGURE 4 of the drawing illustrates a plurality of elements 19 arranged in a row-like manner and mounted in an elongated reflector member 20, with means being provided from a manifold pipe 21 and by a plurality of individual lines 22 to pass a fuel-air mixture to each of the elements. Optional arrangements of elements, such as multiple rows or geometric patterns thereof, may likewise be used in specially formed reflector means to provide for the reflection of infra-red heat from such groupings to a particular heat absorbing area. Optional arrangements may also be made in connection with the fuel supply means, as for example, a fuel-air mixture may be supplied to the header member 21 or, alternatively, a fuel gas supplied within the header means and a plurality of individual valve and air aspirator means utilized between the header and the inlet ends of the catalytic infra-red heat generating elements. For convenience purposes, it is generally advisable to arrange the various elements, in the groups thereof, sufficiently close to one another such that by lighting of one element it will immediately transfer heat to a next adjacent element of the group to effect ignition of the fuel-air mixture on the outer surface of all elements and thus gradually bring about catalytic oxidation from the central core members of all the individual elements of the group. In still other arrangements, there may be elongated cylindrical elements which have fuel-air inlet means at each end closure plate such that there is uniformity of supply to the inner core member and the catalytic surface from two ends and a resulting substantially uniform oxidation of all fuel and air over the entire circumferential and longitudinal portions of each element. For an elongated unit the reflector means, such as the style of reflector 20 in FIGURE 4, may extend longitudinally parallel with the cylindrical infra-red unit.

In order to illustrate the heat generating ability of one of the elements it may be pointed out that a small unit having an approximate one inch external diameter and about 1½ inches long, with an external core member approximately 1¼ inches long and slightly less than ½ inch in diameter, receiving gas-air flow from bottle gas (liquefied propane) and air aspirator means at one end of the element, in the manner and arrangement similar to that of FIGURE 2, there is provided a nominal rating of about 1100 B.t.u.'s per hour output. Comparatively, the infra-red heat generation from this small element is about equivalent to a 500-watt electrical element, having electrical coils arranged to emit infra-red energy.

We claim as our invention:

A catalytic infra-red heat generating element comprising in combination, a cylindrical form high temperature resistant metal gauze outer wall member spaced from and positioned concentrically around an inner tubular form multi-layer high temperature resistant metal gauze core member, said outer wall member and at least one outer layer of said multi-layer metal core member having coatings of a noble metal oxidizing catalyst, at least one of said inner metal gauze members in said core member being noncatalytic, end closure plates across both ends of said inner and outer metal gauze members with axially positioned air-fuel inlet port means through at least one of said closure plates, a fixed positioned circular shoulder support means around said port means of one of said end closure plates sized to fit into and connect with one end of said inner tubular core member, and a circular form support member having a shoulder portion sized to fit into and connect with the opposing end of said core member, with such support member adapted to slidably rest against the inside wall surface of said end closure plate opposing said fixed shoulder support means whereby there may be movement from differential expansion between the support member and the exterior end closure plate, and an enlarged opening in said outer metal gauze wall member adjacent an inlet port end of the element whereby the fuel-air mixture that is radially distributed outwardly through said inner catalytically activated gauze member may be ignited.

References Cited by the Examiner
UNITED STATES PATENTS

| 2,658,742 | 11/53 | Suter et al. | 158—96 X |
| 2,921,176 | 3/55 | Scofield | 158—99 |
| 3,040,805 | 6/62 | Lambert. | |
| 3,155,142 | 11/64 | Stack | 158—99 |

FOREIGN PATENTS

| 1,108,655 | 9/55 | France. |
| 1,136,829 | 1/57 | France. |
| 1,175,620 | 11/58 | France. |
| 288,442 | 11/15 | Germany. |

JAMES W. WESTHAVER, *Primary Examiner.*

FREDERICK L. MATTESON, Jr., *Examiner.*